United States Patent
Sohail et al.

(10) Patent No.: US 10,097,572 B1
(45) Date of Patent: Oct. 9, 2018

(54) SECURITY FOR NETWORK COMPUTING ENVIRONMENT BASED ON POWER CONSUMPTION OF NETWORK DEVICES

(71) Applicant: EMC Corporation, Hopkinton, MA (US)

(72) Inventors: Mohamed Sohail, New Cairo (EG); Stephen Todd, Shrewsbury, MA (US); Said Tabet, Natick, MA (US); Khaled Ahmed, New Cairo (EG)

(73) Assignee: EMC IP Holding Company LLC, Hopkinton, MA (US)

( * ) Notice: Subject to any disclaimer, the term of this patent is extended or adjusted under 35 U.S.C. 154(b) by 214 days.

(21) Appl. No.: 15/175,630

(22) Filed: Jun. 7, 2016

(51) Int. Cl.
  G06F 21/50 (2013.01)
  H04L 29/06 (2006.01)
  G06F 1/28 (2006.01)
  G06F 11/30 (2006.01)

(52) U.S. Cl.
  CPC .......... H04L 63/1425 (2013.01); G06F 1/28 (2013.01); G06F 11/3058 (2013.01)

(58) Field of Classification Search
  None
  See application file for complete search history.

(56) References Cited

U.S. PATENT DOCUMENTS

| 7,877,621 | B2 | 1/2011 | Jacoby et al. |
| 8,543,247 | B2 * | 9/2013 | Boss ................ G01D 4/00 700/22 |
| 8,769,355 | B2 * | 7/2014 | Scott ................ G06F 21/755 714/719 |
| 9,268,938 | B1 | 2/2016 | Aguayo Gonzalez et al. |
| 9,361,175 | B1 * | 6/2016 | Bose ............... G06F 11/0793 |
| 9,509,707 | B2 * | 11/2016 | Patne ............... H04L 63/1416 |
| 9,860,257 | B1 * | 1/2018 | Kumar ................ H04L 63/14 |
| 2006/0026683 | A1 | 2/2006 | Lim |
| 2007/0113225 | A1 | 5/2007 | Felts |
| 2008/0091975 | A1 | 4/2008 | Kladko et al. |

(Continued)

FOREIGN PATENT DOCUMENTS

WO  2012061663 A2  5/2012

OTHER PUBLICATIONS

The Security Ledger, "Pentagon Looks to Analog Monitoring to Secure IoT," Oct. 1, 2015, 7 pages.

(Continued)

Primary Examiner — Christopher A Revak
(74) Attorney, Agent, or Firm — Ryan, Mason & Lewis, LLP

(57) ABSTRACT

Systems, methods, and articles of manufacture comprising processor-readable storage media are provided for detecting anomalies in a computing system based on power consumption of network devices of the computing system. For example, a method includes receiving power consumption data from a computing device operating within a network, wherein the power consumption data indicates reported power usage by the computing device operating within the network, processing the power consumption data to detect anomalous behavior of the computing device operating in the network, and preventing the computing device from transmitting data within the network, when anomalous behavior of the computing device is detected.

20 Claims, 4 Drawing Sheets

(56) References Cited

U.S. PATENT DOCUMENTS

| | | |
|---|---|---|
| 2014/0020075 A1 | 1/2014 | Bhagavatula et al. |
| 2014/0215207 A1 | 7/2014 | Datta et al. |
| 2014/0230055 A1* | 8/2014 | Boehl ............... H04L 9/003 726/22 |
| 2015/0317475 A1 | 11/2015 | Aguayo Gonzalez et al. |
| 2016/0014158 A1 | 1/2016 | Schrecker et al. |
| 2016/0261465 A1* | 9/2016 | Gupta ............... H04L 12/2816 |
| 2017/0005808 A1 | 1/2017 | Gunti et al. |
| 2017/0180380 A1 | 6/2017 | Bagasra |
| 2017/0310482 A1* | 10/2017 | Reed ............... G06F 21/558 |

OTHER PUBLICATIONS

Virta Laboratories Inc., "Virta Labs Introduces PowerGuard," http://www.eecs.umich.ed/eecs/about/articles/2015/VirtaLabs.html, Aug. 12, 2015, 2 pages.

N. Khalil et al., "Wireless Sensor Network for Internet of Things," https://arxiv.org/abs/1606.08407, Jun. 27, 2016, 6 pages.

* cited by examiner

SECURITY FOR NETWORK COMPUTING ENVIRONMENT BASED ON POWER CONSUMPTION OF NETWORK DEVICES

FIELD

The field relates generally to cloud computing systems and, in particular, to security mechanisms for cloud computing systems.

BACKGROUND

The Internet of Things (IoT) is a term that refers to a network computing environment in which physical things such as devices, objects, and other things, etc., are equipped with unique identifiers, network connectivity, and other embedded technologies, which allows such devices, objects, and things to sense, communicate, interact, and send/receive data over one or more communications networks (e.g., Internet, etc.) without requiring human-to-human or human-to-computer interaction. For an IoT application, a "thing" may include any object that can be assigned an IP address and have the capability to transfer data over a communications network. IoT technology is considered to be a key enabler for many emerging and future "smart" applications and, consequently, there is expected to be an exponential increase in the number of network connected devices, objects, and autonomous things, which are connected over a communications network such as the Internet. For example, a "smart" IoT application can be implemented using a wireless sensor network (WSN) comprising a network of wireless sensor nodes that cooperatively sense and control a given application environment using machine-to-machine (M2M) communication. As a result of the expected exponential increase in the number of network connected devices for smart IoT applications, network security will become an increasingly problematic issue, especially for RFID (Radio Frequency Identification) networks and wireless networks which are being widely implemented. Indeed, recent attacks (e.g., Stuxnet, BlackEnergy, etc.) have shown that IoT systems cannot be adequately protected with software alone, as security software can be readily bypassed by clever attackers, who can then remotely control physical systems.

SUMMARY

Embodiments of the invention include systems and methods for detecting anomalies in a computing system based on power consumption of network devices of the computing system. For example, in one embodiment, a method includes receiving power consumption data from a computing device operating within a network, wherein the power consumption data indicates reported power usage by the computing device operating within the network, processing the power consumption data to detect anomalous behavior of the computing device operating in the network, and preventing the computing device from transmitting data within the network, when anomalous behavior of the computing device is detected.

In one embodiment, the computing device comprises a wireless sensor device operating in a wireless sensor network of an IoT computing system, wherein the method is implemented by an application server of the IoT computing system.

Other embodiments of the invention include, without limitation, computing systems and articles of manufacture comprising processor-readable storage media.

DETAILED DESCRIPTION

Embodiments of the invention will be described herein with reference to systems and methods for detecting anomalous activity in a network (e.g., a wireless sensor network) based on power consumption/usage of network devices (e.g., wireless sensor devices) within the network. As explained in further detail below, embodiments of the invention comprise techniques to collect and process power consumption information of network devices operating within a network, for example, to detect for vulnerabilities, security breaches, anomalous device behaviors, device malfunctions, etc., based on the power consumption information. In addition, embodiments of the invention comprise techniques to collect and process power consumption information of network devices operating within a network in conjunction with other types of network-related information regarding network activity, communication patterns between different network devices, behaviors of network devices, etc., to detect for vulnerabilities, security breaches, anomalous device behaviors, device malfunctions, etc., within a network of computing devices. Furthermore, power consumption-based anomaly detection methods as discussed herein can be readily embodied as an add-on to existing network security solutions (e.g., anomaly detection, intrusion detection, etc.) to provide power consumption/usage information as an additional metric that is used in conjunction with other commonly used metrics (network activity, communication patterns between different network devices, behaviors of network devices, etc.) to detect for vulnerabilities, security breaches, anomalous device behaviors, device malfunctions, etc., within a network of computing devices.

It is to be understood that the term "computing system" as used herein with respect to various embodiments are intended to be broadly construed, so as to encompass, for example, a private or public computing system (e.g. cloud computing system), or parts thereof, as well as other types of systems comprising distributed virtual infrastructure and those not comprising virtual infrastructure. For example, the term "computing system" as used herein is intended to be broadly construed, so as to encompass any system comprising multiple networked processing devices such as a data center or any private or public cloud computing system or enterprise network. Moreover, the term "data storage system" as used herein is intended to be broadly construed, so as to encompass, for example, any application that implements a data storage system, or combination of data storage systems, including, but not limited to storage area network (SAN) systems, direct attached storage (DAS) systems, Hadoop Distributed File System (HDFS), as well as other types of data storage systems comprising clustered or distributed virtual and/or physical infrastructure.

Figure 1:
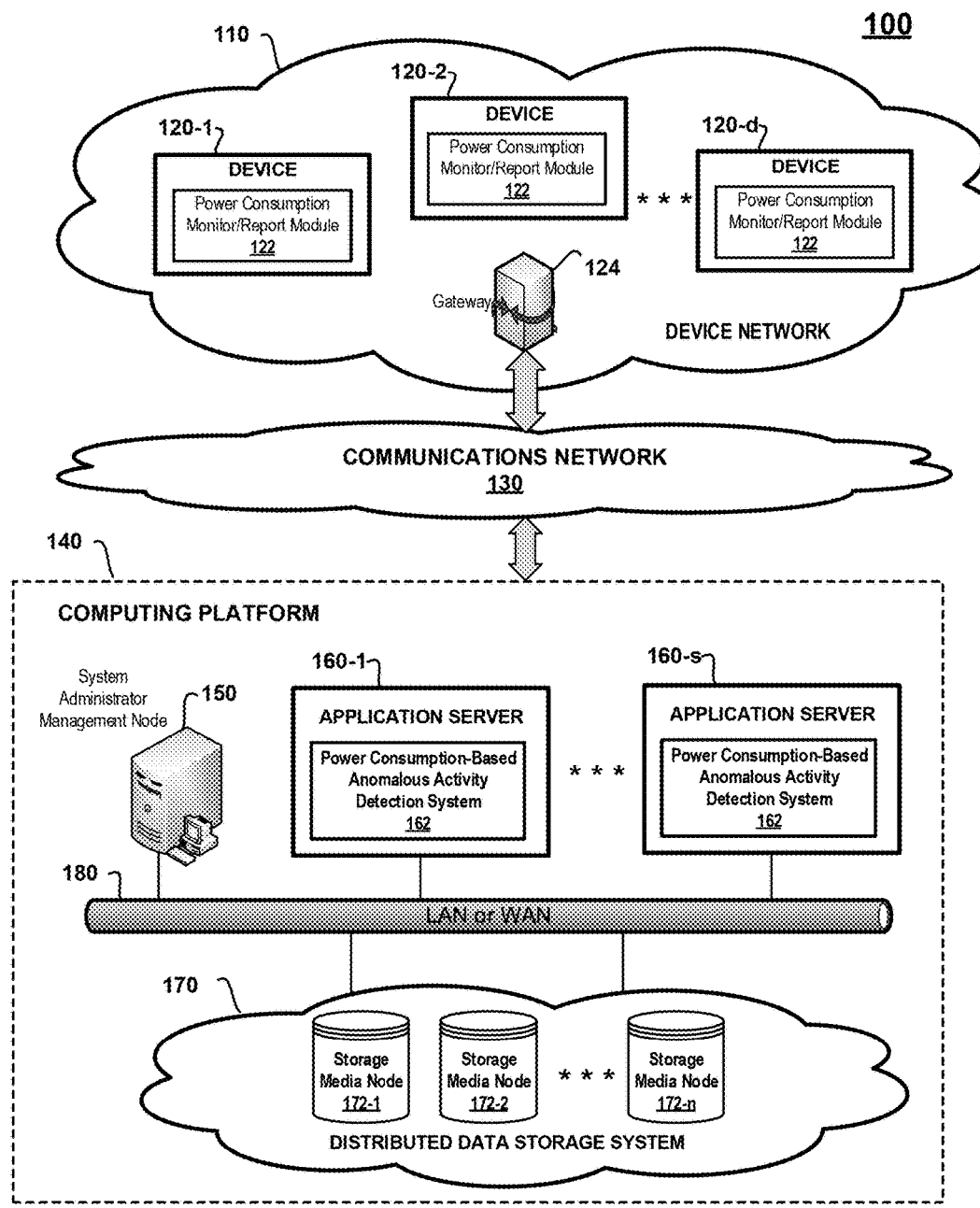
FIG. 1 is a high-level schematic illustration of a computing system which implements a system for detecting anomalous activity within a network of computing devices based on power consumption/usage of the computing devices, according to an embodiment of the invention.

FIG. 1 is a high-level schematic illustration of a computing system 100 which implements a system for detecting anomalous activity within a network of computing devices based on power consumption/usage of the computing devices, according to an embodiment of the invention. The computing system 100 comprises a device network 110, a communications network 130, and a computing platform 140 which is coupled to the device network 110 via the communications network 130. The device network 110 comprises a plurality of computing devices 120-1, 120-2, . . . , 120-$d$ (collectively referred to as computing devices 120) and one or more gateways 124. Each computing device 120-1, 120-2, . . . , 120-$d$ comprises a power consumption monitoring and reporting module 122, as well as other components as discussed below. The computing platform 140 comprises a system administrator management node 150 (or management node 150), a plurality of application server nodes 160-1, . . . , 160-$s$ (collectively referred to as application server nodes 160), and a distributed data storage system 170. The application server nodes 160 implement a power consumption-based anomalous activity detection system 162. The distributed data storage system 170 comprises a plurality of storage media nodes 172-1, 172-2, . . . , 172-$n$ (collectively referred to as storage media nodes 172). The various system components 150, 160 and 170 communicate over a platform communications network 180 (e.g., a wide area network (WAN), a local area network (LAN), etc.).

In one embodiment of the invention, the device network 110 comprises a sensor network (e.g., wireless network) in which the computing devices 120 comprise network-connected sensor nodes (e.g., wireless sensor nodes), as well as actuators, which are implemented for a given IoT application. In general, each sensor node comprises a power management module, a sensor, a microcontroller, and a transceiver (e.g., wireless transceiver). The power management module controls and manages power needed to operate the sensor device. In one embodiment of the invention, the power consumption monitoring and reporting module 122 of each computing device is a component of the power management module of the sensor devices. The sensor of a given sensor node is configured to transform captured signals (e.g., light, vibration, heat, chemical, etc.) into electrical signals that are processed by the microcontroller of the sensor node to generate sensor data. The transceiver of the sensor node transmits the sensor data to a target system.

The sensor nodes within a given monitored environment are configured to form a network through self-organization. In particular, each sensor node broadcasts status data to surrounding sensor nodes and receives status data from other sensor nodes, so that the sensor nodes can detect each other. The sensor nodes self-organize into a connected network according to a certain topology (linear, star, tree, mesh, etc.) for transmitting sensing data to other sensor nodes along a given path in the network by hopping. The sensor data from a given sensor node may be transmitted by multiple sensor nodes to reach the gateway node 124 after a multi-hop routing, wherein sensor data (and other data) is passed to the computing platform 140 via the communications network 130.

The communications network 130 may comprise, for example, a global computer network such as the Internet, a WAN, a LAN, a satellite network, a telephone or cable network, a cellular network, a wireless network such as Wi-Fi or WiMAX, or various portions or combinations of these and other types of networks. The term "network" as used herein is therefore intended to be broadly construed so as to encompass a wide variety of different network arrangements, including combinations of multiple networks possibly of different types. In this regard, the network 130 in some embodiments therefore comprises combinations of multiple different types of communications networks each comprising network devices configured to communicate using Internet Protocol (IP) or other related communication protocols. The communications network 130 comprises intermediate points (such as routers, switches, etc.) and other elements that form a network backbone to establish communication paths and enable communication between network endpoints.

In one embodiment of the invention, the computing system 100 of FIG. 1 comprises an IoT cloud computing system that is configured to support one or more application domains including, but not limited to, healthcare, home and building, retail, energy, manufacturing, transportation, logistics, and media application domains. In addition to sensor nodes, the computing devices 120 may comprise various types of devices, objects and things such as mobile computing devices, smart phones, RFID devices, smart sensors, smart appliances, and other types of smart devices, objects and things that are configured to support IoT applications for one or more application domains. The computing platform 140 manages and processes IoT data received from the various computing devices 120 across one or more application domains.

By way of example, for the healthcare domain, the computing devices 120 can be utilized for remote health monitoring and emergency notification. Health monitoring devices include blood pressure and heart monitors, pacemakers, hearing aids, etc. Insurance companies can utilize IoT data to automatically track and reconcile insurance claims and ensure proper payments are made to claimants. Furthermore, for the home and building domain, the computing devices 120 can be implemented to monitor and control mechanical, electrical and electronic systems that are utilized in residential, commercial or industrial buildings. For example, home and building automation systems can implement IoT sensors and actuators to automatically control lighting, heating, ventilation, air conditioning, appliances, communication systems, entertainment and home security devices, etc.

Moreover, for the energy domain, IoT sensors and actuators can be implemented, for example, in energy consuming devices (e.g., switches, power outlets, light bulbs, etc.) and be equipped to communicate with power supply companies to provide IoT data that enables the power supply companies to effectively balance power generation and energy usage through "smart grids." For example, IoT devices would enable power supply companies to acquire and process IoT data with regard to energy usage in various regions and automatically control and manage production and distribution of electricity in such regions, e.g., control and manage distribution devices such as transformers. In addition, for the manufacturing domain, IoT devices can be used for network control and management of manufacturing equipment or manufacturing process control.

For an IoT application, the computing platform 140 performs data processing and storage functions to support one or more IoT network applications. In particular, the application server nodes 160 of the computing platform 140 are configured to host and manage one or more IoT applications, which are used by multiple, simultaneously connected users and/or entities in one or more application domains. Depending on the implementation of the computing platform 140, the application server nodes 160 are configured to, e.g., execute business logic, execute scripts and services to query databases, and perform other computing functions that are needed to host and deliver IoT applications and services to multiple end users, service providers, and/or organizations. In one embodiment of the invention, the application server nodes 160 and distributed data storage system 170 are implemented using a cluster of server nodes that reside in a single facility (e.g., data center facility of private company) or a cluster of server nodes that reside in two or more data center facilities or remote locations (distributed over a cloud network) of a given service provider, for example.

The distributed data storage system 170 is implemented using any type of data storage system, or combination of data storage systems, including, but not limited to a SAN system, a NAS system, HDFS, as well as other types of data storage systems comprising clustered or distributed virtual and/or physical infrastructure. The storage media nodes 172 comprise groups (e.g., storage arrays) of data storage devices such as HDDs (hard disk drives), Flash storage devices, disk storage devices, SSD (solid state drive) devices, or other types and combinations of non-volatile memory and associated drive types. The storage media nodes 172 may comprise homogeneous storage pools, heterogeneous storage pools, or a combination of homogeneous and heterogeneous storage pools. Homogeneous data storage pools have a single drive type (e.g., Flash, HDD, etc.), whereas heterogeneous data storage pools can consist of different drive types.

The power consumption-based anomalous activity detection systems 162 of the application server nodes 160 collectively implement a distributed power consumption-based anomalous activity detection system with distributed functionality across some or all of the application server nodes 160 for detecting anomalous activity within the device network 110 of computing devices 120 based, at least in part on, the monitored power consumption/usage of the computing devices 120. The power consumption monitoring and reporting modules 122 of the computing devices 120 are configured to monitor and report power consumption data to the computing platform 140, wherein the power consumption data of a given computing device 120 comprises an indication of power usage by the given computing device 120 operating within the device network 110. In one embodiment of the invention, the power consumption data that is collected by the power consumption monitoring and reporting modules 122 of the computing devices 120 is streamed to the computing platform 140 on a continual basis, or periodic basis.

The power consumption-based anomalous activity detection systems 162 of the application server nodes 160 are configured to collect large amounts of streamed power consumption data received from the computing devices 120 in the device network 110, and index and store the received power consumption data for subsequent processing and analysis to detect for anomalous behaviors and activities within the device network 110 based on the streamed power consumption data. In other embodiments of the invention, the device network 110 comprises one or more nodes (e.g., the gateway node 124), which implement a network activity and communications monitoring system that is configured to collect and stream certain types of network-related information to the computing platform 140, wherein such network-related information is used in conjunction with the power consumption data to detect for anomalous behaviors and activities within the device network 110. For example, such network-related information includes, but is not limited to, monitored network activity in device network 110, monitored communication patterns between different computing devices 120 in the device network 110, monitored behaviors of the computing devices 120 and other nodes in the device network 110, etc.

Exemplary system frameworks for the power consumption-based anomalous activity detection systems 162 of the application server nodes 160 will be discussed in further detail below with reference to FIG. 2. In addition, various methods according to embodiments of the invention which are implemented by the power consumption-based anomalous activity detection systems 162 for detecting anomalous activity will be described in further detail below with reference to FIGS. 2, 3 and 4, for example.

The management node 150 implements methods for registering the computing devices 120 with the computing platform 140, wherein the registration process results in the assignment of unique device IDs to registered devices. The unique device IDs are used to associate power consumption data and other relevant data (which is received and stored by the computing platform 140) to the computing devices 120. In addition, the management node 150 is configured to control operation of the registered computing devices 120 within the device network 110. For example, when a given one of the power consumption-based anomalous activity detection systems 162 of the application server nodes 160 detects that a given computing device 120 is exhibiting anomalous behavior, the management node 150 is alerted/notified of such anomalous behavior and then proceeds to at least temporarily block/prevent the given computing device 120 from passing data to other computing devices 120 within the device network 110 or otherwise prevent the given computing device 120 from storing or accessing data from the backend distributed data storage system 170 of the computing platform 140.

Figure 2:
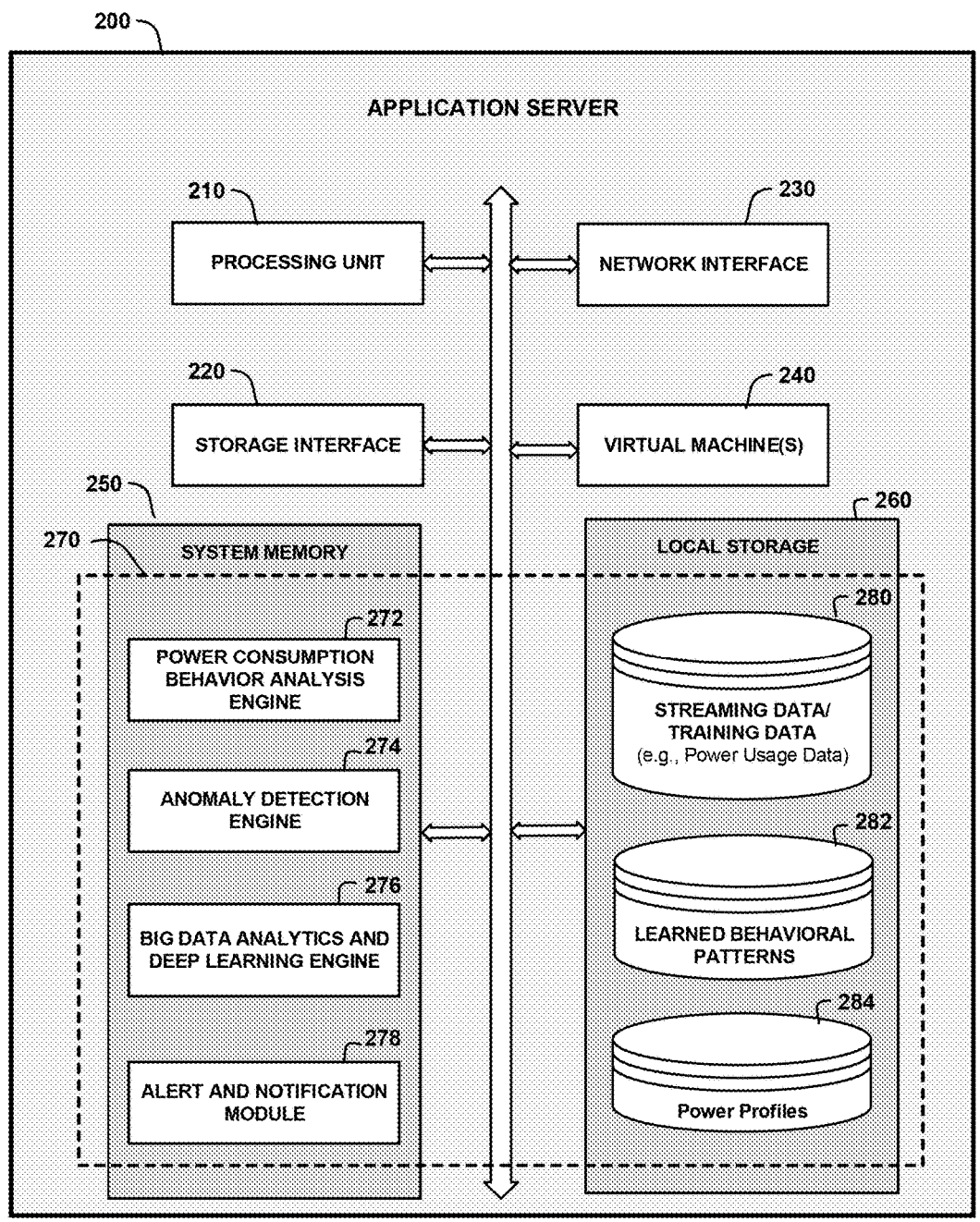
FIG. 2 schematically illustrates an embodiment of an application server which can be implemented in the computing system of FIG. 1, according to an embodiment of the invention.

FIG. 2 schematically illustrates an embodiment of an application server node which can be implemented in the computing platform 140 of FIG. 1, according to an embodiment of the invention. More specifically, FIG. 2 illustrates an application server 200 which comprises a processing unit 210, storage interface circuitry 220, network interface circuitry 230, virtual machine(s) 240, system memory 250, and local storage 260. In addition, the application server 200 comprises a power consumption-based anomalous activity detection system 270 according to one embodiment of the invention, which comprises a power consumption behavior analysis engine 272, an anomaly detection engine 274, a big data analytics and deep learning engine 276, an alert and notification module 278, a database of streaming data and training data 280, a database of learned behavioral patterns 282, and a database of power profiles 284. The power consumption-based anomalous activity detection system 270 of FIG. 2 illustrates an embodiment of an anomalous activity detection system 162 that is implemented on a given application server node 160 in FIG. 1. In one embodiment, the system components 272, 274, 276, and 278 comprise software programs that generate and/or utilize various types of information stored in the databases 280, 282, and 284. Furthermore, in one embodiment, the functionality of the system components 272, 274, 276, and 278 are distributed over multiple application server nodes, wherein some or all of the system components 272, 274, 276, and 278 execute on multiple application server nodes to implement a distributed power consumption-based anomalous activity detection system. Moreover, in a distributed environment, the application server nodes share the information stored in their local databases 280, 282, and 284 to implement a distributed power consumption-based anomalous activity detection system.

The processing unit 210 comprises one or more processors that are configured to process program instructions and data to execute a native operating system (OS) and application programs that run on the application server 200. The processing unit 210 comprises one or more of a computer processor, a microprocessor, a microcontroller, an application-specific integrated circuit (ASIC), a field programmable gate array (FPGA), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), application-specific integrated circuits (ASICs), and field programmable gate array (FPGAs), and other types of specialized processors or coprocessors that are configured to execute one or more fixed functions. The term "hardware accelerator" broadly refers to any hardware that performs "hardware acceleration" to perform certain functions faster and more efficient, than is possible for executing such functions in software running on a more general purpose processor.

The storage interface circuitry 220 enables the processing unit 210 to interface and communicate with the system memory 250, local storage 260, and other off-infrastructure storage media, using one or more standard communication and/or storage control protocols to read data from or write data to volatile and non-volatile memory/storage devices (e.g., system memory 250 and local storage 260). The network interface circuitry 230 enables the application server 200 to interface and communicate with a network and other system components. The network interface circuitry 230 may comprise conventional transceivers of a type well known in the art (e.g., network interface cards, I/O adaptors, etc.).

The virtual machine(s) 240 are implemented using a hypervisor platform which executes on the application server 200. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. A hypervisor is an example of what is more generally referred to as "virtualization infrastructure." The hypervisor runs on the physical infrastructure, e.g., CPUs and/or storage devices, of the application server 200. An example of a commercially available hypervisor platform that may be used to implement portions of an IoT computing system in one or more embodiments of the invention is the VMware® vSphere™ which may have an associated virtual infrastructure management system such as the VMware® vCenter™. The underlying physical infrastructure may comprise one or more distributed processing platforms that include storage products such as VNX® and Symmetrix VMAX®, both commercially available from EMC Corporation (Hopkinton, Mass.).

The system memory 250 comprises electronic storage media such as random access memory (RAM), read-only memory (ROM), or other types of memory, in any combination. The term "memory" or "system memory" as used herein refers to volatile and/or non-volatile memory which is utilized to store application program instructions that are read and processed by the processing unit 210 to execute a native operating system and one or more applications hosted by the application server 200, and to temporarily store data that is utilized and/or generated by the native OS and application programs running on the application server 200. The local storage 260 comprises any type of non-voltage storage media including, but not limited to, HDDs, Flash storage devices, disk storage devices, SSD devices, or other types and combinations of non-volatile memory and associated drive types.

In one embodiment, the system components 272, 274, 276 and 278 as shown in FIG. 2 comprises software programs that may be stored in the local storage 260 and loaded into the system memory 250 for execution by the processing unit 210. In this regard, the system memory 250 and local storage 260 and other memory or storage media as described herein, which have program code tangibly embodied thereon, are examples of what is more generally referred to herein as "processor-readable storage media" that store executable program code of one or more software programs. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

The power consumption-based anomalous activity detection system 270 receives and processes streaming data from the plurality of computing devices 120 (e.g., sensors) within the device network 110 (e.g., sensor network), and stores the received streaming data in the database of streaming data and training data 280. For example, the streaming data comprises power consumption/usage data which is monitored and reported by each of the power consumption monitoring and reporting modules 122 that execute on the computing devices 120. The streaming data may comprise other information such as network activity and communication patterns between the computing devices 120 within the device network 110. The received streaming data is persistently stored in the database 280 and associated with respective computing devices 120. The stored streaming data is processed by one or more of the various computing engines 272, 274 and 276 to detect any anomaly within the device network 110 based on, e.g., an amount of power consumption and/or identified patterns of power usage by the computing devices 120.

For example, the power consumption behavior analysis engine 272 implements methods to process power consumption data that is received from the computing devices 120 (and stored in the database 280) to determine if the power consumption/usage of a given computing device is normal (i.e., expected) or abnormal (e.g., excessive) at a given time for a given application. In one embodiment, the power consumption behavior analysis engine 272 utilizes information in the learned behavioral patterns database 282 and/or the power profiles database 284 to process the streamed power consumption/usage data of the computing devices 120 to detect for anomalies associated with abnormal power consumption.

In particular, the power profile database 284 comprises a collection of "power profiles" for each type of computing device 120 that is implemented in the device network 110. In one embodiment, the power profiles comprise vendor-created power profiles that provide information regarding normal ranges of power usage of various types of vendor-specific computing devices (e.g., wireless sensors) for different applications/uses of the computing devices. The vendor-created power profiles provide an initial baseline of power usage information which can be compared against the actual power consumption (e.g., average power over a period of time) of a given computing device 120 within the device network 110 to determine if the given computing device 120 is consuming a normal or abnormal amount of power for a given application.

In addition, in one embodiment, the power consumption-based anomalous activity detection system 270 is configured to update the vendor-specific power profiles over time by building or otherwise learning power consumption behavior profiles for each of the computing devices 120 within the device network 110 based on historical power consumption/usage information that is reported by each of the different computing devices 120 over time for different use scenarios. The power consumption behavior profiles can be stored in the learned behavioral patterns database 282 and used for anomaly detection, or otherwise stored in the power profiles database 284 as updated power profiles that are used for anomaly detection.

The anomaly detection engine 274 implements methods to process streaming data (e.g., network activity data, power consumption data, etc.) received from the computing devices 120 and the device network 110 to detect for possible anomalous activity related to security breaches (intrusion detection) such as sniffer attacks, denial-of-service attacks, man-in-the-middle attacks, etc., using behavioral patterns that are stored in the learned behavioral patterns database 282. In accordance with embodiments of the invention, the anomaly detection engine 274 implements intrusion detection methods in which the reported power consumption/usage of computing devices is one of a plurality of metrics that are used to detect anomalous network activity and behaviors based on the behavioral patterns stored in the learned behavioral patterns database 282.

For example, a sniffer attack refers to a process that is used by attackers (e.g., hackers, malware, etc.) to capture network traffic using a sniffer application, wherein the sniffer application can capture network packets and access/analyze data within the network packets for unauthorized purposes (e.g., capture sensitive network information, such as passwords, account information etc.). A denial-of-service (DoS) attack refers to a process that is used by attackers to render a given computing device or network resource unavailable for its intended use. For example, a DoS attack may cause a network device to send an excessive amount of false packets (referred to as flooding) into the network, or fully consume resources of a computing device to starve the computing device of resources for its normal operation, etc. A man-in-the-middle attack refers to a process that is used by an attacker to intercept all relevant messages passing between two computing devices and inject new messages, which gives the attacker the ability to capture and manipulate sensitive information in real-time.

In typical IoT applications that implement a network of wireless sensor devices, for example, the wireless sensors are constrained in power, memory, and processing power. As such, various types of attacks such as outlined above can result in significant, abnormal power consumption of the wireless sensor devices. In this regard, the power consumption/usage behavior of one or more of the computing devices can be used to generate signatures or behavior patterns that are maintained in the learned behavioral patterns database 282.

In one embodiment, the learned behavioral patterns database 282 comprises "normal behavior profiles" which comprise signatures or patterns of normal network activities and/or normal network device behavior. In this embodiment, the anomaly detection engine 274 is configured to compare the normal behavior profiles with a current set of streaming data in database 280 to detect certain network activities and device behaviors as being "abnormal" when such network activities and device behaviors deviate from one or more normal behavior profiles by statistically significant amounts.

In another embodiment, the learned behavioral patterns database 282 comprises "abnormal behavior profiles" which comprise signatures or patterns of known abnormal network activities and/or abnormal network device behavior. In this embodiment, the anomaly detection engine 274 is configured to compare the abnormal behavior profiles with a current set of streaming data in database 280 to detect certain network activities and device behaviors that are known to be abnormal when such network activities and device behaviors are determined to positively correspond to one or more abnormal behavior profiles within a predefined statistical range. In another embodiment, the learned behavioral patterns database 282 comprises both normal and abnormal behavior profiles, which are used for anomaly detection.

The big data analytics and deep learning engine 276 implements methods to process a large amount of streaming data and/or training data that is stored in the database of streaming data/training data 280 to generate learned behavior patterns that are stored in the learned behavioral patterns database 282. Big data analytic methods are implemented to mine a massive amount of streaming data that is collected over time (e.g., power consumption data, network activity data, etc.) and extract meaningful behavioral patterns for computing devices (e.g., sensor nodes) operating in a device network based on the streaming data collected over time. Deep learning methods are implemented to extract high-level, complex abstractions as data representations through a hierarchical learning process. Complex abstractions are learned at a given level based on relatively less complex abstractions formulated in a preceding level in the hierarchy. The deep learning methods are used to analyze and learn patterns from massive amounts of raw streaming data that is stored in the database 280 which is primarily unlabeled and un-categorized.

In view of the above, it is to be appreciated that the various data processing engines 272, 274, and 276 can be implemented to detect for various types of anomalous network behaviors, activities, and/or intrusions based on power consumption data alone, or based on power consumption data in conjunction with other types of data/metrics such as patterns of network communications and other behaviors of computing devices operating within a device network. Depending on the application, the power consumption-based anomalous activity detection system 270 can implement one, some, or all of the data processing engines 272, 274, and 276 shown in FIG. 2. The alert and notification module 278 implements methods for logging a description of potential anomalous activity which is detected by any one of the data processing engines 272, 274, and 276, and sending alerts and notification to a management node (e.g., the system administrator management node 150, FIG. 1) for further analysis and review.

Figure 3:
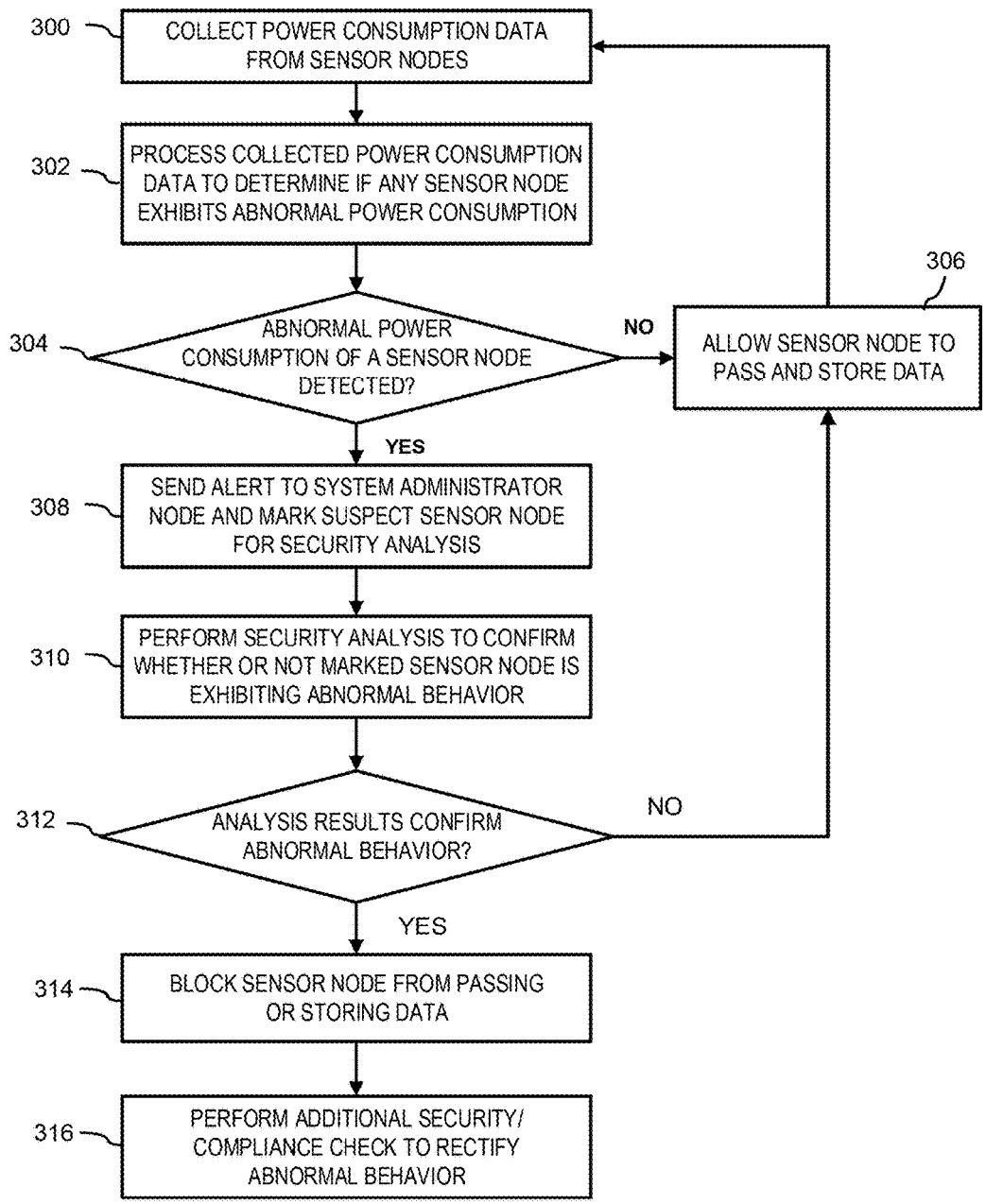
FIG. 3 is a flow diagram of a method for detecting anomalous activity within a network of computing devices based on power consumption/usage of the computing devices, according to an embodiment of the invention.

FIG. 3 is a flow diagram of a method for detecting anomalous activity within a network of computing devices based on power consumption/usage of the computing devices, according to an embodiment of the invention. In particular, FIG. 3 illustrates an exemplary mode of operation of the power consumption-based anomalous activity detection system 270 for detecting anomalous activity within a network of sensor nodes based on reported power consumption/usage of the sensor nodes operating within the network, according to an embodiment of the invention. The power consumption-based anomalous activity detection system 270 collects power consumption data that is received from sensor nodes within the sensor network (block 300). The power consumption data comprises an indication of power usage reported by the sensor nodes operating within the sensor network. The streaming power consumption data is stored in the streaming data database 280 using suitable indexing techniques to associate power consumption data with corresponding sensor nodes that report the power consumption data to the power consumption-based anomalous activity detection system 270.

The collected power consumption data is processed to determine if any sensor node is exhibiting abnormal power consumption (block 302). In one embodiment, this process can be implemented by the power consumption behavior analysis engine 272 processing the collected power consumption data against learned behavioral patterns of power consumption of the sensor nodes, which are stored in the learned behavioral patterns database 282, or otherwise using baseline or updated power profiles of the sensor nodes, which are stored in the power profiles database 284.

A determination is made as to whether any of the sensor nodes currently operating within the sensor network are detected as exhibiting abnormal power consumptions (block 304). If a given sensor node is not detected as exhibiting abnormal power consumption (negative determination in block 304), the sensor node is allowed to continue passing data within the sensor network and storing data in the backend distributed data storage system 170 of the computing platform 140 (block 306). On the other hand, when a given sensor node is detected as exhibiting abnormal power consumption (affirmative determination in block 304), the alert and notification module 278 sends an alert to the management node 150 of the computing platform 140 and the given node is marked as "suspect" for a security analysis (block 308).

A security analysis is then performed to confirm whether or not the marked sensor node is actually exhibiting abnormal behavior (block 310). This security analysis can be performed manually by a system administrator, or performed automatically (or semi-automatically) using other anomaly detection methods and/or manual review methods to verify the results of the initial detection. If the results of the security analysis confirm that the given sensor node is not exhibiting abnormal behavior (negative determination in block 312), the sensor node is allowed to continue passing data within the sensor network and storing data in the backend distributed data storage system 170 of the computing platform 140 (block 306). On the other hand, if the results of the security analysis confirm that the given sensor node is actually exhibiting abnormal behavior (affirmative determination in block 312), the sensor node is prevented/blocked from passing data within the sensor network or storing data in the backend distributed data storage system 170 of the computing platform 140 (block 314). An additional security check or compliance check can then be performed to rectify the detected abnormal behavior of the sensor node (block 316).

Figure 4:
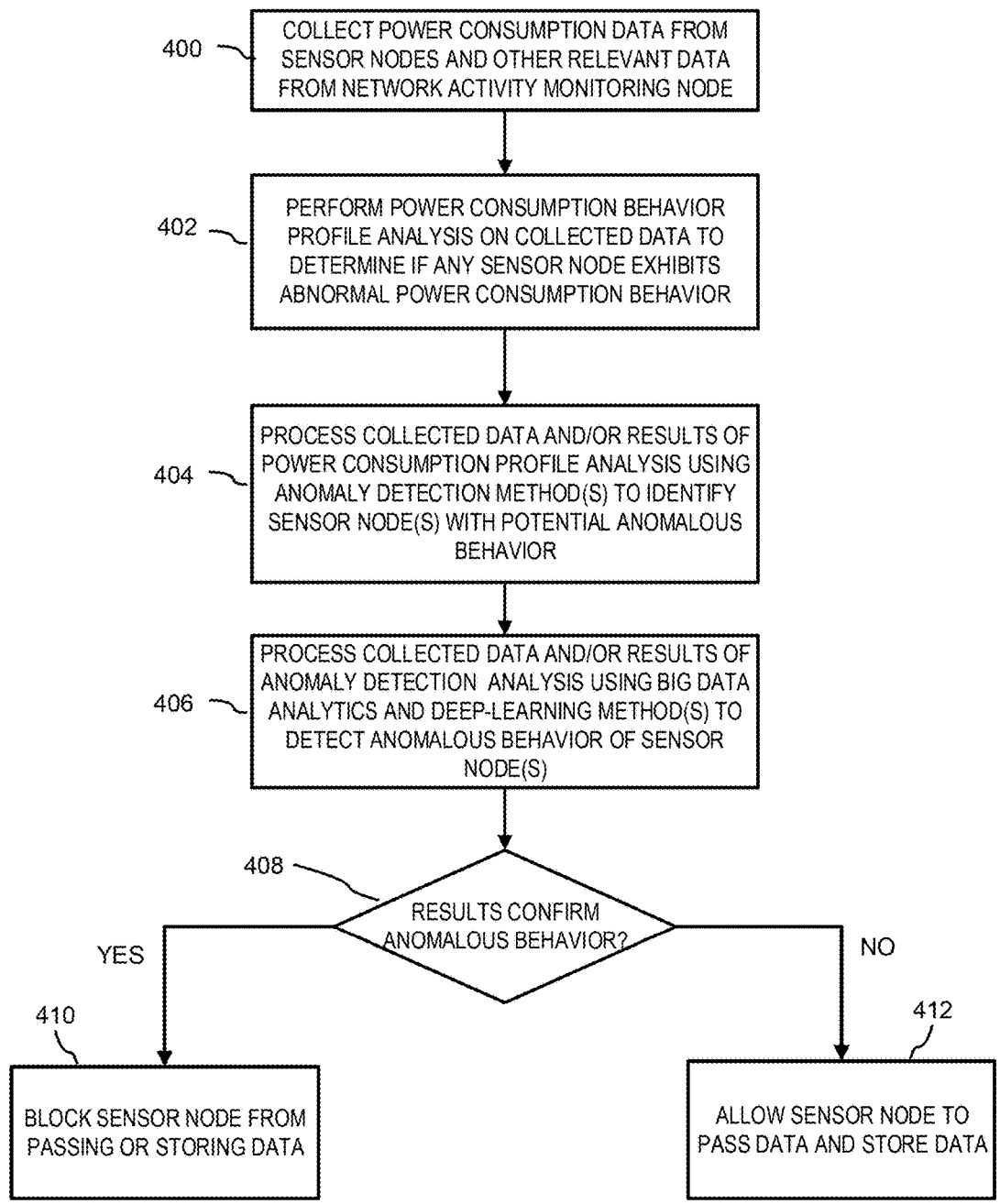
FIG. 4 is a flow diagram of a method for detecting anomalous activity within a network of computing devices based on power consumption/usage of the computing devices, according to another embodiment of the invention.

FIG. 4 is a flow diagram of a method for detecting anomalous activity within a network of computing devices based on power consumption/usage of the computing devices, according to another embodiment of the invention. In particular, FIG. 4 illustrates an exemplary mode of operation of the power consumption-based anomalous activity detection system 270 for detecting anomalous activity within a sensor network based on reported power consumption/usage data from sensor nodes operating within the sensor network and/or other types of network-related information that is streamed from the sensor network with regard to, e.g., sensor network activities, communication patterns between different sensor nodes, behaviors of sensor nodes, etc., according to an embodiment of the invention. The power consumption-based anomalous activity detection system 270 collects power consumption data that is streamed from sensor nodes within the sensor network, as well as any other relevant data indicative of network activity, communication patterns between different sensor nodes, and other behaviors of the sensor nodes, etc., which is streamed from a network activity monitoring node in sensor network (block 400). The streaming data received from the sensor network is stored in the streaming data database 280.

As a first level of analysis, a power consumption behavior profile analysis can be performed on the collected power consumption data to determine if any sensor node exhibits abnormal power consumption behavior (block 402). In one embodiment, this process can be implemented by the power consumption behavior analysis engine 272 processing the collected power consumption data against learned behavioral patterns of power consumption of the sensor nodes, which are stored in the learned behavioral patterns database 282, or otherwise using baseline or updated power profiles of the sensor nodes, which are stored in the power profile database 284.

As a second level of analysis, an anomaly detection process can be performed to process the collected streaming data and/or the results of the power consumption behavior profile analysis to identify sensor nodes that are exhibiting potential anomalous behavior (block 404). In one embodiment, this process can be implemented by the anomaly detection engine 274 processing the collected data against the learned behavioral patterns of the sensor nodes, which are stored in the learned behavioral patterns database 282, to detect for possible anomalous behaviors of one or more sensor nodes based on reported power consumption data in conjunction with other relevant data with regard to network activity, communication patterns between different sensor nodes, and other behaviors of the sensor nodes, etc.

As a third level of analysis, a big data and deep learning analysis can be performed to process the collected streaming data and/or the results of the anomaly detection process to identify sensor nodes that are exhibiting anomalous behavior (block 406). In one embodiment, this process can be implemented by the big data analytics and deep learning engine 276 processing the collected data against learned behavioral patterns of the sensor nodes, which are stored in the learned behavioral patterns database 282.

In one embodiment, the processing results from each of the different levels of anomaly detection (blocks 402, 404 and 406) are collectively processed to make a final determination as to whether one or more sensor nodes are exhibiting anomalous behavior (block 408). When a given sensor node is determined to be exhibiting anomalous behavior (affirmative determination in block 408), the given sensor node is blocked from passing data in the sensor network or storing data to the backend data storage system (block 410). On the other hand, if a given sensor node is not identified as exhibiting anomalous behavior (negative determination in block 408), the given sensor node is allowed to continue passing data in the sensor network and storing data to the backend data storage system (block 412).

While embodiments of the invention will be described with reference to illustrative computing systems, data storage systems, and associated servers, computers, memory devices, storage devices, and other processing devices, it is to be understood, however, that embodiments of the invention are not restricted to use with the particular illustrative system and device configurations shown. In this regard, it is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
   running an anomalous activity detection system on a server node within a network;
   receiving, by the anomalous activity detection system, power consumption data which is streamed from a computing device operating within the network, wherein the power consumption data indicates reported power usage by the computing device operating within the network;
   processing, by the anomalous activity detection system, the power consumption data to detect anomalous behavior of the computing device operating in the network; and
   automatically preventing, by the anomalous activity detection system, the computing device from transmitting data to other computing devices within the network, and from accessing a backend data storage system within the network, in response to the detection of anomalous behavior of the computing device;
   wherein the method is implemented by a processor executing program instructions.

2. The method of claim 1, wherein processing the power consumption data to detect anomalous behavior of the computing device operating in the network comprises:
   accessing a power profile associated with the computing device, wherein the power profile specifies a normal range of power usage for the computing device operating within the network; and
   comparing the reported power usage by the computing device with the power profile associated with the computing device to determine whether the reported power usage of the computing device is normal or abnormal.

3. The method of claim 2, wherein the power profile associated with the computing device comprises a vendor-specified power profile associated with the computing device.

4. The method of claim 2, wherein the power profile associated with the computing device specifies a normal range of power usage for the computing device operating within the network, which is determined based on a history of reported power usage by the computing device.

5. The method of claim 1, wherein processing the power consumption data to detect anomalous behavior of the computing device operating in the network comprises:
   accessing a behavior profile associated with the computing device, wherein the behavior profile specifies a learned behavior of the computing device based on a history of reported power usage by the computing device; and
   comparing the reported power usage by the computing device with the accessed behavior profile to determine whether a current behavior of the computing device is normal or abnormal.

6. The method of claim 1, wherein processing the power consumption data to detect anomalous behavior of the computing device operating in the network comprises processing the power consumption data to detect if the computing device is functioning correctly or incorrectly.

7. The method of claim 1, wherein processing the power consumption data to detect anomalous behavior of the computing device operating in the network comprises processing the power consumption data to detect if the computing device has been breached by an attacker.

8. The method of claim 1, further comprising processing network communication activity of the computing device in conjunction with the power consumption data of the computing device to detect anomalous behavior of the computing device operating in the network.

9. The method of claim 1, wherein the computing device comprises a wireless sensor device operating in a wireless sensor network of an IoT (Internet of Things) computing system.

10. An article of manufacture comprising a non-transitory processor-readable storage medium having stored therein program code of one or more software programs, wherein the program code is executable by one or more processors to implement a method comprising:
   running an anomalous activity detection system on a server node within a network;
   receiving, by the anomalous activity detection system, power consumption data which is streamed from a computing device operating within the network, wherein the power consumption data indicates reported power usage by the computing device operating within the network;
   processing, by the anomalous activity detection system, the power consumption data to detect anomalous behavior of the computing device operating in the network; and
   automatically preventing, by the anomalous activity detection system, the computing device from transmitting data to other computing devices within the network, and from accessing a backend data storage system within the network, in response to the detection of anomalous behavior of the computing device.

11. The article of manufacture of claim 10, wherein processing the power consumption data to detect anomalous behavior of the computing device operating in the network comprises:
  accessing a power profile associated with the computing device, wherein the power profile specifies a normal range of power usage for the computing device operating within the network; and
  comparing the reported power usage by the computing device with the power profile associated with the computing device to determine whether the reported power usage of the computing device is normal or abnormal.

12. The article of manufacture of claim 11, wherein the power profile associated with the computing device comprises a vendor-specified power profile associated with the computing device.

13. The article of manufacture of claim 11, wherein the power profile associated with the computing device specifies a normal range of power usage for the computing device operating within the network, which is determined based on a history of reported power usage by the computing device.

14. The article of manufacture of claim 10, wherein processing the power consumption data to detect anomalous behavior of the computing device operating in the network comprises:
  accessing a behavior profile associated with the computing device, wherein the behavior profile specifies a learned behavior of the computing device based on a history of reported power usage by the computing device; and
  comparing the reported power usage by the computing device with the accessed behavior profile to determine whether a current behavior of the computing device is normal or abnormal.

15. The article of manufacture of claim 10, wherein processing the power consumption data to detect anomalous behavior of the computing device operating in the network comprises processing the power consumption data to detect if the computing device is functioning correctly or incorrectly.

16. The article of manufacture of claim 10, wherein processing the power consumption data to detect anomalous behavior of the computing device operating in the network comprises processing the power consumption data to detect if the computing device has been breached by an attacker.

17. The article of manufacture of claim 10, further comprising program code that is executable by the one or more processors for processing network communication activity of the computing device in conjunction with the power consumption data of the computing device to detect anomalous behavior of the computing device operating in the network.

18. The article of manufacture of claim 10, wherein the computing device comprises a wireless sensor device operating in a wireless sensor network of an IoT (Internet of Things) computing system.

19. A system, comprising:
  at least one processor; and
  system memory configured to store program code, wherein the program code is executable by the at least one processor to:
  run an anomalous activity detection system on a server node within a network;
  receive, by the anomalous activity detection system, power consumption data which is streamed from a computing device operating within the network, wherein the power consumption data indicates reported power usage by the computing device operating within the network;
  process, by the anomalous activity detection system, the power consumption data to detect anomalous behavior of the computing device operating in the network; and
  automatically prevent, by the anomalous activity detection system, the computing device from transmitting data to other computing devices within the network, and from accessing a backend data storage system within the network, in response to the detection of anomalous behavior of the computing device.

20. The system of claim 19, wherein the computing device comprises a wireless sensor device operating in a wireless sensor network, and wherein the system comprises an application server that is implemented in an Internet-of-Things cloud computing system.

* * * * *